United States Patent [19]
Walker et al.

[11] Patent Number: 6,004,689
[45] Date of Patent: Dec. 21, 1999

[54] BATTERY CASE

[75] Inventors: Thomas P. Walker, Morrison; Tristan E. Juergens, Telluride, both of Colo.

[73] Assignee: Bolder Technologies Corporation, Golden, Colo.

[21] Appl. No.: 09/206,812

[22] Filed: Dec. 7, 1998

Related U.S. Application Data

[63] Continuation of application No. 08/784,853, Jan. 15, 1997, Pat. No. 5,895,728, which is a continuation-in-part of application No. 08/534,790, Sep. 27, 1995, Pat. No. 5,677,078.

[51] Int. Cl.⁶ ............................ H01M 2/12; H01M 2/04; H01M 2/06
[52] U.S. Cl. .......................... 429/53; 429/159; 429/163; 429/177; 429/178
[58] Field of Search ............................ 429/53, 159, 175, 429/177, 178, 179, 180, 181, 182, 183, 184

[56] References Cited

U.S. PATENT DOCUMENTS

| | | |
|---|---|---|
| 2,543,106 | 2/1951 | Harriss . |
| 2,836,642 | 5/1958 | Bauer . |
| 3,178,317 | 4/1965 | Maddaloni . |
| 3,219,485 | 11/1965 | Foecking et al. . |
| 3,757,194 | 9/1973 | Weber et al. . |
| 3,883,789 | 5/1975 | Achenbach et al. . |
| 3,918,460 | 11/1975 | King et al. . |
| 3,977,907 | 8/1976 | Roth et al. . |
| 3,999,110 | 12/1976 | Ramstrom et al. . |
| 4,084,123 | 4/1978 | Lineback et al. . |
| 4,097,654 | 6/1978 | Guazzoni . |
| 4,117,203 | 9/1978 | Sjogren . |
| 4,123,598 | 10/1978 | Hammel . |
| 4,125,681 | 11/1978 | Sjogren . |
| 4,160,857 | 7/1979 | Nardella et al. . |
| 4,216,277 | 8/1980 | Uba . |
| 4,399,201 | 8/1983 | Nagahara . |
| 4,421,832 | 12/1983 | Uba . |
| 4,447,749 | 5/1984 | Reeb, Jr. et al. . |
| 4,495,259 | 1/1985 | Uba . |
| 4,521,498 | 6/1985 | Juergens . |
| 4,576,880 | 3/1986 | Verdier et al. . |
| 4,592,972 | 6/1986 | Juergens et al. . |
| 4,599,283 | 7/1986 | Thiele et al. . |
| 4,606,982 | 8/1986 | Nelson et al. . |
| 4,616,169 | 10/1986 | Proffitt . |
| 4,751,452 | 6/1988 | Kilmer et al. . |
| 4,769,299 | 9/1988 | Nelson . |
| 4,780,379 | 10/1988 | Puester . |
| 4,835,410 | 5/1989 | Bhagwat et al. . |
| 4,871,629 | 10/1989 | Bunyea . |
| 5,045,086 | 9/1991 | Juergens . |
| 5,047,300 | 9/1991 | Juergens . |
| 5,089,738 | 2/1992 | Bergqvist et al. . |
| 5,144,217 | 9/1992 | Gardner et al. . |
| 5,198,313 | 3/1993 | Juergens . |
| 5,200,280 | 4/1993 | Karasa . |
| 5,208,525 | 5/1993 | Lopic et al. . |
| 5,213,913 | 5/1993 | Anthony, III et al. . |

(List continued on next page.)

*Primary Examiner*—Stephen Kalafut
*Attorney, Agent, or Firm*—Gibson, Dunn & Crutcher LLP

[57] ABSTRACT

An electrochemical cell case and method of manufacturing an electrochemical battery are provided. The cell case includes a main body that encloses a plurality of individual cells in separate, contiguous compartments. After the cells have been inserted into the compartments, the compartments are hermetically sealed. The compartments may be separately filled and vented, and the cell of each compartment receives end connectors such as rivet connectors. The elements are electrically interconnected, such as in a series configuration. A top cap attaches to the main body, and encloses the interconnected cell terminals. The top cap may also enclose other electronics, such as battery recharging circuitry or a temperature sensor. The top cap may be sized and shaped to mate with connectors on specific electrical devices, and may be removable so that another top cap may be installed for use with another device.

63 Claims, 3 Drawing Sheets

U.S. PATENT DOCUMENTS

| | | |
|---|---|---|
| 5,217,824 | 6/1993 | Womack . |
| 5,246,790 | 9/1993 | Mooney et al. . |
| 5,283,137 | 2/1994 | Ching . |
| 5,296,314 | 3/1994 | Millauer et al. . |
| 5,336,953 | 8/1994 | Allemann . |
| 5,360,153 | 11/1994 | Cooper . |
| 5,368,954 | 11/1994 | Bruns . |
| 5,368,961 | 11/1994 | Juergens . |
| 5,391,972 | 2/1995 | Gardner et al. . |
| 5,415,956 | 5/1995 | Ching . |
| 5,437,938 | 8/1995 | Mitsui et al. . |
| 5,476,731 | 12/1995 | Karsten et al. . |
| 5,489,486 | 2/1996 | Glover . |
| 5,599,641 | 2/1997 | Ching, Jr. et al. . |
| 5,677,078 | 10/1997 | Juergens . |
| 5,686,202 | 11/1997 | Hooke et al. . |
| 5,707,758 | 1/1998 | Iwatsu et al. ............... 429/181 X |

BATTERY CASE

This application is a continuation of application Ser. No. 08/784,853, filed Jan. 15, 1997, now U.S. Pat. No. 5,895,728 which is a continuation-in-part of application Ser. No. 08/534,790, filed Sep. 27, 1995, now U.S. Pat. No. 5,677,078. These two applications are incorporated herein by reference.

FIELD OF THE INVENTION

The present invention relates to the field of electrochemical battery cells and cell cases, and more particularly to a battery that contains a plurality of lead-acid cells in separated gas spaces and that may interchangeably mate with a variety of electrical connectors such as those integrated within power tools.

BACKGROUND OF THE INVENTION

The use of portable, rechargeable electrochemical cells has been rapidly increasing in recent years. With developments in rechargeable battery technology, rechargeable batteries are used for power not only in traditional areas such as flashlights and small electronic devices but also in heavy duty power tools, temporary power sources, and even vehicles. Of course, rechargeable batteries are also widely used in the starting systems of internal combustion vehicles and tools. Many of the rechargeable batteries in use today are nickel-cadmium, nickel-metal hydride or lithium batteries. Recent advances in lead-acid batteries, such as those disclosed in U.S. Pat. No. 5,047,300 to Juergens and assigned to the assignee of the present invention, have increased the utility and the popularity of portable, rechargeable lead-acid battery systems.

Of course, some case or housing must be used to contain the cells that comprise a battery so that the cells' electrical energy may be safely and conveniently used and transported. Since many uses require the battery to be frequently recharged, the battery should be easily manipulable between a battery-powered device and a recharger. It is also desirable that a battery be compatible, perhaps with adaptations, with a variety of the connectors that are often found on battery-powered devices, so that the same battery may potentially be used with many different devices. A case that contains several cells is often termed a "battery pack" or a "power pack." In the present application, it should be understood that what is referred to as a "battery case" may contain several electrochemical cells, wherein each cell may comprise a plurality of electrodes or, for example, two long spirally-wound electrodes.

Many rechargeable battery cases and rechargers and tools useful therewith have been developed, and these devices address a variety of uses. U.S. Pat. Nos. 5,144,217 and 5,391,972 to Gardner et al. disclose a combination battery back/recharger wherein the charger may accommodate several battery configurations. U.S. Pat. No. 5,200,280 to Karasa discloses a device that surrounds a battery to prevent accidental discharge. U.S. Pat. No. 4,339,201 discloses a battery case to prevent terminal short-circuiting. U.S. Pat. Nos. 4,871,629 to Bunyea; 3,883,789 to Achenbach et al.; 3,999,110 to Ramstrom et al.; 5,368,954 to Bruns; 5,213,913 to Anthony et al., 5,208,525 to Lopic et al.; 4,084,123 to Lineback et al.; 5,089,738 to Bergquist et al.; 5,336,953 to Alleman; 4,616,169 to Proffitt; 4,447,749 to Reeb, Jr. et al.; 4,339,201 to Nagahara; and 3,757,194 to Weber et al. disclose latching arrangements and other mechanical and electrical connections between battery cases and electric devices.

U.S. Pat. No. 4,751,452 to Kilmer et al. discloses a battery case that precludes the battery from attempted recharge when the battery is of a non-rechargeable type. U.S. Pat. No. 5,296,314 to Millauer provides a battery case keyed to provide the appropriate voltage to selected electric devices.

None of these prior art devices, however, address the difficulties associated with lead-acid cells, such as filling, venting, and attaching end connectors. Some of these devices are meant to function in several electric tools; however, none of these devices are designed to allow the same unit of cells to be adapted to a variety of tools by substituting external connectors.

SUMMARY OF THE INVENTION

The present invention includes a cell case (sometimes called a "monoblock") that houses a plurality of electrochemical cells, preferably of the lead-acid type. The individual cells are located in hermetically-sealed compartments, so that there is no atmospheric communication between the several cells. The cells are electrically connected to each other, such as in a series configuration, so that they may be attached to a tool or other electrically-powered device and function as one electrical unit. The monoblock includes interchangeable adapters including electrical connectors, so that the same cells may be used with a variety of tools or other devices. The adapters may also include electrical circuitry, such as recharging circuitry. If included, the recharging circuitry may incorporate a variety of features, such as a heat sensor or a voltage sensor that modulates the battery charging parameters, such as time of charge and charge current, to the charging condition of the battery. Other circuity may be included in addition to or instead of a charger, such as a safety cut-off that electrically disconnects the battery if the battery temperature exceeds a preselected value.

The individual electrochemical cells are preferably spirally-wound ultra-thin plate lead acid cells, which allow for about twice the useable energy of competing cells, such as nickel-cadmium cells, at high discharge rates. The increase in usable energy primarily results from the lead-acid cells' ability to supply a relatively constant voltage as the cells discharge. Nickel-cadmium cells, in contrast, lose a significant amount of voltage during discharge, so that much of the energy theoretically available may not be supplied at a power level sufficient for many applications. For instance, nickel-cadmium batteries may not be able to supply the voltage required to provide enough torque to a drill to allow the drill to penetrate many materials or to spin the drill bit fast enough to provide satisfactory drilling speeds after the cells have become partially discharged.

The monoblock is preferably constructed of several components that allow for the lead-acid cells to be essentially permanently grouped together, and for interchangeable adapters to be connected thereto. The monoblock also allows for the cells to be filled with electrolyte and to vent gas that may form within the cells, and to contain any electrolyte that may otherwise leak from the cell. The central unit consists of connected plastic containers, where each container is shaped to hold an individual spirally wound cell. The containers are preferably arranged in an array of rows and columns, so that the monoblock will have a rectangular block-like shape. The containers are preferably cylindrical, so that interstices are formed between the rows and columns. These interstices allow a sensor, such as a temperature sensor, to be inserted into the core of the monoblock.

The containers are manufactured with open-ended bottoms, so that the spirally wound cells may be inserted through these bottoms into the containers. After the cells are inserted into the container, a bottom cover plate is attached to the bottom of the containers, so that cells are sealed within. The bottom cover plate contains ventilation ports, such as Bunsen valves, beneath each container, so that excess gas may be released. Additionally, the cover plate contains a hole beneath each container, so that an end connector may be attached to each cell. Preferably, two rivet-type end connectors are used within each cell, one each for the positive and negative connectors. A bottom cap is attached beneath the cover plate to form the bottom surface of the monoblock. The bottom cap encloses the electrical connections between the cells, as well as any electrolyte that may happen to leak from the battery. Absorbent, foraminous material may be placed between the bottom cap and the cover plate to absorb any leaked electrolyte. The bottom cap preferably also includes ventilation ports, to release any gas that is vented from the containers into the area between the cover plate and the bottom cap. The cover plate may be attached to the containers by any of several suitable methods, such as ultrasonic or thermal welding or by adhesives. The bottom cap may be similarly attached to the cover plate.

The main body contains an integral top that forms the top of each container. Above each container, the integral top has two holes. One hole receives a rivet that serves as the electrical connector of the opposite polarity from the connector that attaches to the container bottom. The second hole is a fill port that allows electrolyte to be introduced into each container. After the electrolyte has been introduced, this fill port may be sealed, such as by a plug.

A top unit removably attaches to the main body, and serves several functions. The top unit has two electrical connectors that mate with the electrical connectors of the main body. As described above, the electrical connectors of each cell are connected to one another, such as in a series configuration. The positive and negative connectors of the series assembly mate with the positive and negative connectors, respectively, of the top unit. The top unit is physically configured to mate with a specific electric tool or family of tools. It may also contain additional electrical features such as a recharger or a temperature sensor, or both. The top unit may be removed from the main body, allowing a user to power different battery operated devices. Another top unit that physically connects with another electrical device may be mounted onto the main body, and the monoblock may again be used.

It should therefore be appreciated that the present invention allows a group of batteries, specifically lead-acid batteries, to power a variety of battery powered devices. The invention provides a safe, durable, and convenient method of combining a number of lead-acid batteries together, and may include supplementary electronics such as a recharger.

DETAILED DESCRIPTION OF THE INVENTION

Figure 1:
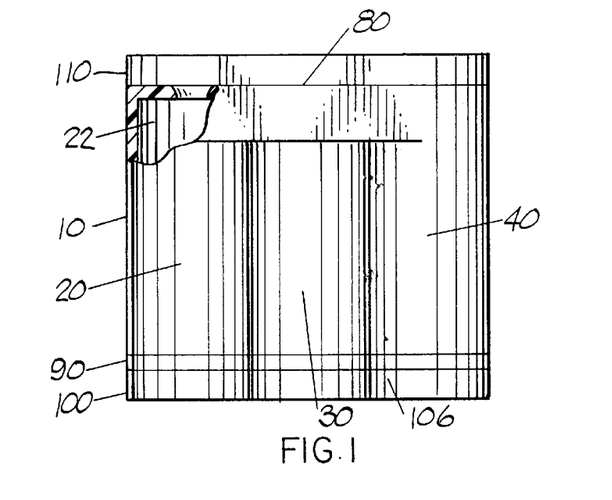
FIG. 1 is a side elevation view of an embodiment of the present invention.
Figure 2:
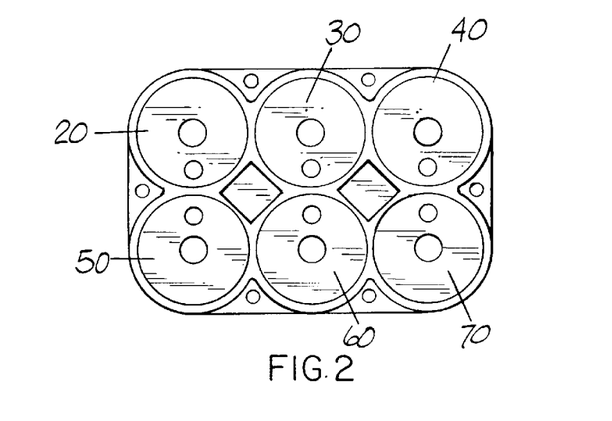
FIG. 2 is bottom plan view of the main body of the present invention.
Figure 9:
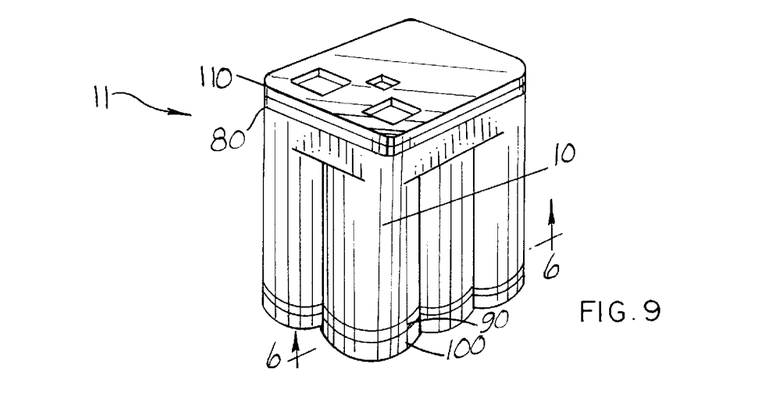
FIG. 9 is a perspective view of the present invention.

Referring to FIG. 9, an embodiment of the present invention 11 has a main body 10 that includes a plurality of connected cell compartments. As can be seen in FIGS. 1 and 2, the main body 10 includes six compartments, 20, 30, 40, 50, 60, and 70, arranged in two rows and three columns. Each compartment may enclose a separate electrochemical cell, such as representative cell 22 contained within compartment 20. The compartments are contiguous, and each compartment has a sidewall that is partially shared with a portion of a neighboring, contiguous compartment. For instance, compartment 20 shares a portion of its sidewall with compartment 30 and also shares a portion of its sidewall with compartment 50.

Figure 3:
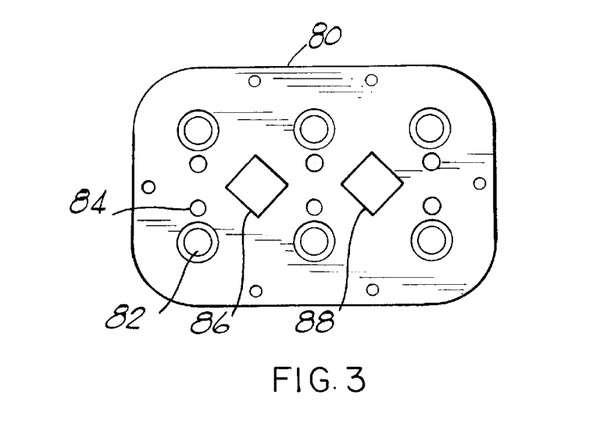
FIG. 3 is a top plan view of the main body of the present invention.

The main body 10 includes an integral top 80 that covers each of the compartments (see FIG. 3). The top 80 contains two openings associated with each compartment. One opening, such as opening 84 associated with compartment 20, is a fill port that allows electrolyte to be added to the cell 22. The second opening, such as opening 82, also associated with compartment 20, allows the insertion of a cell terminal so that the electricity produced within each compartment may be utilized. Preferably, the terminal is a rivet connector of the type disclosed in U.S. Pat. No. 5,677,078.

The top 80 also contains two additional openings 86, 88 that extend between compartment groupings. The compartments are preferably cylindrical, so that a separation exists at the compartment interfaces. The openings 86, 88 allow ventilation through the top 80 along the entire depth of the compartments. Optionally, a temperature sensor (not shown) may be inserted into either the opening 86 or the opening 88. The cells may be disconnected from their load if the sensor indicates that the battery is operating at an unsafe or otherwise undesirable temperature.

With reference to FIG. 2, the bottom of the main body 10 is essentially open, allowing the cells (such as cell 22) to be inserted into the compartments (such as compartment 20). The cells cannot be inserted from above, because the integral top 80 substantially blocks access to the compartments. After the cells are inserted into the compartments, a bottom cover plate 90 is attached to the bottom of the main body 10 in order to contain the cells within the compartments (see FIG. 4). The bottom cover plate 90 has the same cross sectional dimensions as the main body 10, and may be attached thereto by ultrasonic or thermal welding, adhesives, or other suitable means to form an hermetic seal.

Figure 4:
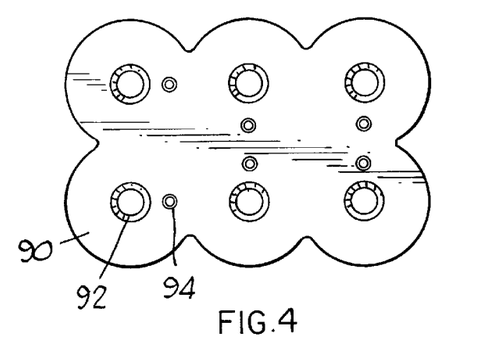
FIG. 4 is a top plan view of the bottom cover of the present invention.

The bottom cover plate 90 has two openings associated with each compartment. The first opening, such as opening 92 associated with compartment 20, allows the insertion of a cell terminal into the compartment. This corresponds to the opening 82 in the top sheet 80. However, the cell terminal inserted through the opening 92 will be connected to plates of opposite polarity than is the separate terminal inserted through the opening 82.

Figure 4A:
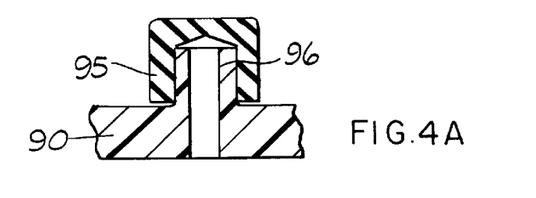
FIG. 4A is a detailed side profile view of a Bunsen valve of the bottom cover.

The second opening, such as opening 94 associated with compartment 20, serves as a valve that vents the compartment 20 of excess gas that may develop therein during the chemical reactions. Preferably, the opening 94 is through a valve stem 96 that projects downwards from the bottom cover plate 90 as shown in the detail of FIG. 4A. While many one-way valves may be used, a Bunsen valve is preferred because of its simplicity and reliability. In a Bunsen valve, an elastomeric sheath 95 is fitted over the valve stem 96. When the gas pressure within the compartment 20 exceeds the external gas pressure, the sheath 95 is displaced from the valve stem 96, so that gas may be vented from the compartment 20. When the pressure within the compartment 20 is reduced to closer to the ambient pressure, the elastomeric quality of the sheath 95 causes it re-seat onto the valve stem 96.

Figure 6:
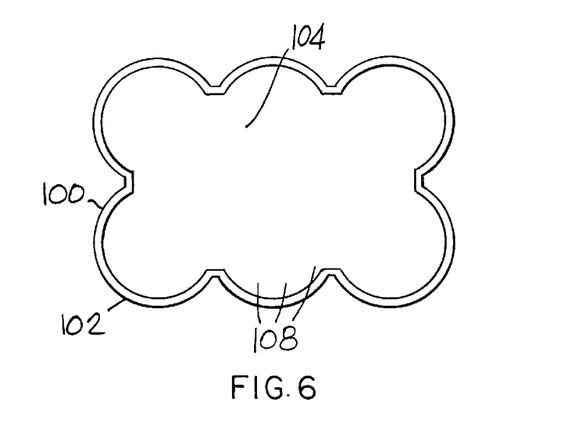
FIG. 6 is a top plan view of the bottom cap of the present invention.

Referring to FIG. 6, a bottom cap 100 attaches beneath the cover plate 90. The bottom cap 100 has substantially the same cross sectional dimensions as the bottom cover plate 90. A raised ridge 102 surrounds a central platform 104 of the bottom cap, so that the ridge 102 contacts the bottom cover plate 90 and the central platform 104 is spaced away from the cover plate 90. This space between the bottom cover plate 90 and the bottom cap 100 provides space for routing terminal connector wire to connect the bottom terminals of the cells contained in the compartments, so that the electronics are shielded from exterior contact. Additionally, the space maintained between the cover plate and the bottom cap serves as a reservoir to collect any electrolyte that may leak from the cells. Foraminous, absorbent material may be included in the space 106 (see FIG. 1) between the bottom cover plate 90 and the bottom cap 100 to absorb any leaked electrolyte. However, the type of lead-acid cells preferably contained within the compartments maintain electrolyte absorbed within separator material of the cell, so that electrolyte leakage is uncommon. The bottom cap is preferably perforated, such as with micro-perforations 108, to allow any pressure caused by gas transport through the valve stem openings to escape.

Figure 5:
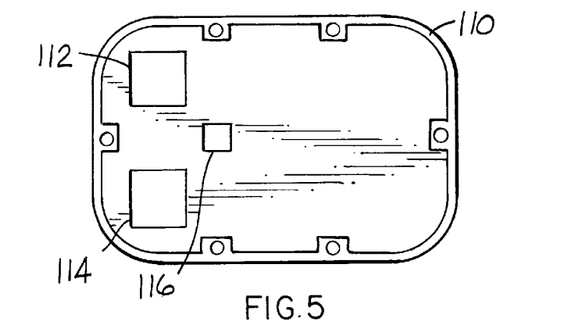
FIG. 5 is top plan view of a top cap according on one embodiment of the present invention.

A variety of top caps, such as top cap 110, may fit over the top 80 of the main body (see FIG. 5). The top cap 110 provides the electrical connectors that join the battery terminals of the cells contained within the main body 10 to an electric tool or other device. Two terminal cutouts, 112, 114, are formed in the top cap 110. The terminals may take a variety of forms depending on the specific application. For instance, if the battery is to be used as a starter power source for a vehicle, such as a motorcycle, simple lugs may protrude from or be accessible through the cutouts 112, 114.

More specialized connectors may be used to connect with specific connectors for other applications. Preferably, the top cap is removable from the top 80. A variety of top caps may then be used with the same main body 10, allowing the same battery to be used in a variety of applications. The top caps will vary in size, shape and type of electrical connectors, depending on the application. The attachment between top caps and the top 80 may be any suitable means, such as by adhesive ultrasonic welding or screw.

A sensor cutout 116 may also be formed in the top cap, directly above the opening 86 that extends between the compartments 20, 30, 50, and 60. The sensor cut out 116 provides an opening through which a sensing probe may be inserted into the core of the main body 10. The operation of the battery may be controlled depending upon parameters such as temperature that may be sensed by the sensor probe in the opening 86 (see FIG. 3).

Figure 7:
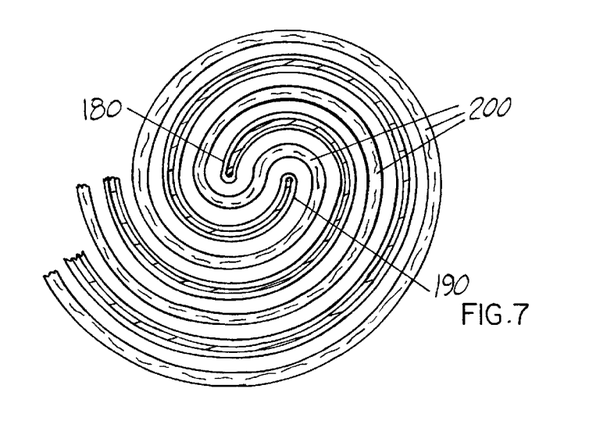
FIG. 7 is a diagrammatic horizontal cross section of the electrochemically active components of a spirally wound cell of the type preferably contained within the main body of FIG. 1.

While the present battery has application with a variety of electrochemical cells, it is particularly suited for use with an embodiment of the lead-acid cells of the type described in U.S. Pat. No. 5,677,078 and other patents in the chain of this application, the contents of which are hereby incorporated. With reference to FIG. 7, such batteries are generally spirally wound, and include a negative plate 180 and a positive plate 190 that are separated from each other by separator material 200. Acceptable active positive plate materials include, among others, sulfated lead pastes, PbO, $Pb_3O_4$, or leady oxide. Acceptable active negative plate material includes, among others, sulfated lead paste, PbO, or leady oxide. An example of suitable separator material is a glass mat composed of microfiber material consisting of 90% fibers 1 to 4 microns in diameter and 10% fibers that are somewhat larger.

As described in U.S. Pat. No. 5,677,078, the cells preferably use cast-on end connectors to connect the positive and negative plates of each cell to their respective terminals. For example, a rivet extends through opening 82 (see FIG. 3) into the compartment 20 (see FIG. 1), and contacts the cast on connector. Expanding the rivet mandrel causes the body of the rivet to form a strong interference fit with the cast-on connector. The fit between the terminal and the connector is further strengthened by an elastomeric sleeve disposed between the connector and compartment 20. The expansion of the rivet compresses the elastomeric sleeve, thereby forming a fluid seal around the compartment opening 82 as well as a mechanically and electrically strong connection.

The cell contained within compartment 20 is filled by introducing electrolyte through fill port 84. Perforations in the cast-on connector allow the introduced electrolyte to disperse within the region of compartment 20 containing the plates and separator. After the compartment has been filled, the fill port 84 is permanently sealed, such as by welding or otherwise attaching a connector plug into the fill port 84.

Venting of the compartment 20 is preferably accomplished by the venting opening 94 located in the valve stem 96 of the bottom cover plate 90.

While a preferred embodiment has been described, it should be apparent that many variations could be made to the monoblock that would not essentially alter its functionality. As one example, some of the components that have been described as being placed on the top of the monoblock could be placed on the bottom, and vice versa.

EXAMPLE

Figure 8:
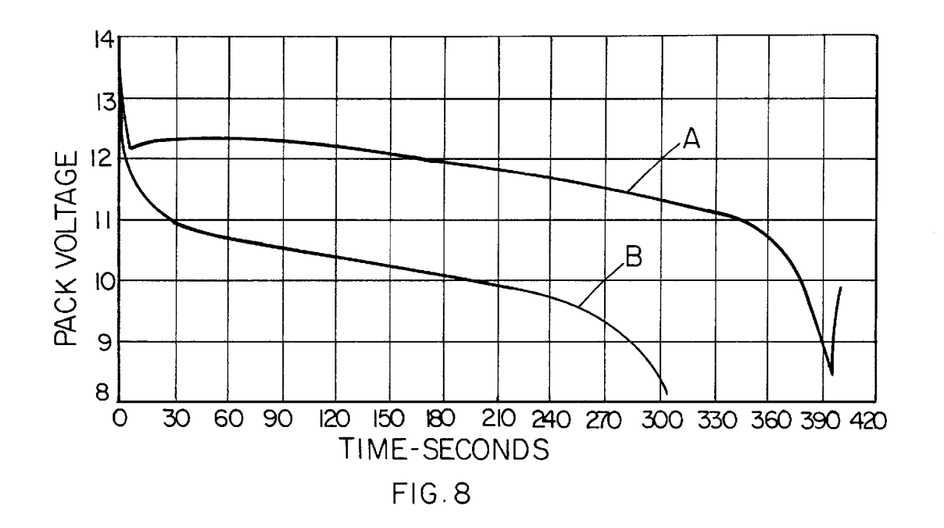
FIG. 8 is voltage discharge graph comparing of the performance of a battery according to present invention with a competing battery.

A monoblock according to the present invention was constructed using six one-inch diameter cells with a depth of 2.350 inches. The lead-acid cells were of the type described in the above referenced patents and applications of which this application is a continuation-in-part. The monoblock was used to power a drill to repeatedly drill holes through a wooden test board. Referring to FIG. 8, curve A shows the voltage across the board as a function of time. Curve B shows the voltage versus time results of a nickel-cadmium battery pack of the same approximate size, subject to the same test conditions. The results indicate a much more rapid decline in voltage for the nickel-cadmium battery. Energy within the nickel-cadmium battery may not be available at sufficient voltages to satisfy certain applications. The monoblock of the present invention, in contrast, supplied most of its energy at useable voltages. The voltage was maintained within 10 per cent of a nominal rating for about 350 seconds; the voltage began to rapidly decline at about 370 seconds.

We claim:

1. An electrochemical cell case, comprising a body having a plurality of compartments, each compartment to receive an electrochemical cell, said compartments being sealed from one another, each compartment having an upper portion and a lower portion and a pressure relief valve, and a first terminal hole through said body into said upper portion and a second terminal hole into said lower portion.

2. The electrochemical cell case of claim 1, wherein said body includes a first exterior surface, and further comprising a cap having a raised perimeter edge attached to said first exterior surface to define a space between said cap and said first exterior surface.

3. The electrochemical cell case of claim 2, wherein said cap is adapted for electrical communication between said electrochemical cells and an electrical device.

4. The electrochemical cell case of claim 3, wherein said cap is shaped to reversibly and physically connect with said electrical device.

5. The electrochemical cell case of claim 2, further including an electrical unit, said electrical unit being housed in said space and being selected from the group consisting of a recharger for recharging said electrochemical cells and a temperature sensor for monitoring the temperature within said body.

6. An electrochemical cell case, comprising:
   (a) a body having a plurality of compartments, each compartment including a sidewall and a cavity, said cavity at least partially defined by said sidewall and being adapted for receiving an electrochemical cell and having a first and second end, said compartments being sealed from one another and each compartment having a pressure relief valve;
   (b) a first cover covering said first end of said cavities;
   (c) a second cover covering said second end of said cavities; and
   (d) a first and second terminal hole extending into each said cavity, wherein no more than one of said terminal holes is in said first cover and wherein no more than one of said terminal holes is in said second cover.

7. The electrochemical cell case of claim 6, wherein at least one of said first and second cover includes a sealable port for introducing electrolyte into said cavity.

8. The electrochemical cell case of claim 6, further including a cap attached to one of said first and second cover, said cap allowing for electrical communication between said electrochemical cells and an electrical device.

9. The electrochemical cell case of claim 8, wherein said cap is shaped to reversibly and physically connect with said electrical device.

10. The electrochemical cell case of claim 6, further including a first cap having a raised perimeter edge which is attached to said first cover to define a first space between said first cap and said first cover.

11. The electrochemical cell case of claim 10, further including a second cap having a raised perimeter edge which is attached to said second cover to define a second space between said second cap and said second cover.

12. The electrochemical cell case of claim 10, further including a layer of absorbent material disposed in said first space for absorbing fluid released into said first space.

13. The electrochemical cell case of claim 10, wherein said first cap includes at least one perforation to allow the release of pressure from said first space.

14. The electrochemical cell case of claim 11, wherein at least one of said first and second cap includes at least one terminal port for passage of an electrical terminal to outside said electrochemical cell case.

15. The electrochemical cell case of claim 11, further including an electrical unit, said electrical unit being housed in said first or second space and being selected from the group consisting of a recharger for recharging said electrochemical cells and a temperature sensor for monitoring the temperature within said body.

16. The electrochemical cell case of claim 6, wherein said compartments and cavities are substantially cylindrical in shape so as to receive substantially cylindrical electrochemical cells.

17. The electrochemical cell case of claim 16, wherein said electrochemical cell case includes at least three of said cylindrical compartments with their longitudinal axes parallel.

18. The electrochemical cell case of claim 16, wherein said electrochemical cell case includes exactly six cylindrical compartments positioned in two rows of three with their longitudinal axes parallel.

19. An electrochemical cell case, comprising:
   (a) a body having a plurality of cavities, each of said cavities being adapted to receive an electrochemical cell and being sealed from one another, and each cavity having a pressure relief valve and a first and second end;
   (b) a first cover to cover said first end;
   (c) a second cover to cover said second end; and
   (d) a cap attached to one of said first and second cover, said cap being shaped to physically connect with an electrical device and allowing for electrical communication between said electrochemical cells and said electrical device.

20. The electrochemical cell case of claim 19, wherein said cap is shaped so it can be partially inserted within said electrical device.

21. The electrochemical cell case of claim 20, wherein said cap can be reversibly connected to said electrical device.

22. The electrochemical cell case of claim 19, further including an electrical unit, said electrical unit being housed in said cap and being selected from the group consisting of a recharger for recharging said electrochemical cells and a temperature sensor for monitoring the temperature within said body.

23. The electrochemical cell case of claim 19, wherein said cavities are substantially cylindrical in shape so as to receive substantially cylindrical electrochemical cells.

24. The electrochemical cell case of claim 23, wherein said electrochemical cell case includes at least three cylindrical cavities with their longitudinal axes parallel to one another.

25. The electrochemical cell case of claim 23, wherein said electrochemical cell case includes exactly six cylindrical cavities positioned in two rows of three with their longitudinal axes parallel.

26. A battery, comprising:
   (a) a plurality of electrochemical cells; and
   (b) an electrochemical cell case including a body having a plurality of compartments, each of said compartments being shaped to receive one of said electrochemical cells, said compartments being sealed from one another, and each compartment having an upper portion and a lower portion and a pressure relief valve; and a first terminal hole through said body into said upper portion and a second terminal hole through said body into said lower portion.

27. The battery of claim 26, wherein said body includes a first exterior surface, and further comprising a cap having a raised perimeter edge attached to said first exterior surface to define a space between said cap and said first exterior surface, said cap being adapted for electrical communication between said electrochemical cells and an electrical device.

28. The battery of claim 27, wherein said cap is shaped to reversibly and physically connect with said electrical device.

29. The battery of claim 27, further including an electrical unit, said electrical unit being housed in said space and being selected from the group consisting of a recharger for recharging said electrochemical cells and a temperature sensor for monitoring the temperature within said body.

30. The battery of claim 26, wherein said electrochemical cells include a positive plate, a negative plate and a separator disposed therebetween, said positive plate, negative plate and separator being spirally wound together.

31. The battery of claim 26, wherein said electrochemical cells include a positive plate, a negative plate and a separator disposed therebetween, said positive plate, negative plate and separator being arranged in parallel stacks.

32. The battery of claim 30, wherein at least one of said positive and negative plate is less than 0.01 inches thick.

33. The battery of claim 31, wherein at least one of said positive and negative plate is less than 0.01 inches thick.

34. The battery of claim 30, wherein said positive and negative plate include a metal film sandwiched between layers of electrochemically active paste and wherein said film of at least one of said positive and negative plate is substantially non-perforated.

35. The battery of claim 31, wherein said positive and negative plate include a metal film sandwiched between layers of electrochemically active paste and wherein said film of at least one of said positive and negative plate is substantially non-perforated.

36. A battery, comprising:
(a) a plurality of electrochemical cells; and
(b) an electrochemical cell case including:
 (i) a body having a plurality of compartments, each compartment including a sidewall and a cavity, said cavity at least partially defined by said sidewall and being adapted for receiving one of said electrochemical cells and having a first and second end, said compartments being sealed from one another and each compartment having a pressure relief valve;
 (ii) a first cover covering said first end of said cavities;
 (iii) a second cover covering said second end of said cavities; and
 (iii) a first and second terminal hole extending into each said cavity,
wherein no more than one of said terminal holes is in said first cover and wherein no more than one of said terminal holes is in said second cover.

37. The battery of claim 36, further comprising a cap attached to one of said first and second cover, said cap allowing for electrical communication between said electrochemical cells and an electrical device and being shaped to reversibly and physically connect with said electrical device.

38. The battery of claim 36, further including a first cap having a raised perimeter edge attached to said first cover to define a first space between said first cap and said first cover.

39. The battery of claim 38, further including a second cap having a raised perimeter edge which is attached to said second cover to define a second space between said second cap and said second cover.

40. The battery of claim 38, further including a layer of absorbent material disposed in said first space for absorbing fluid released into said first space.

41. The battery of claim 39, further including an electrical unit, said electrical unit being housed in said first or second space and being selected from the group consisting of a recharger for recharging said electrochemical cells and a temperature sensor for monitoring the temperature within said body.

42. The battery of claim 36, wherein said compartments and cavities are substantially cylindrical in shape so as to receive substantially cylindrical electrochemical cells.

43. The battery of claim 42, wherein said electrochemical cell case includes at least three of said cylindrical compartments with their longitudinal axes parallel.

44. The battery of claim 42, wherein said case includes exactly six cylindrical compartments positioned in two rows of three with their longitudinal axes parallel.

45. The battery of claim 36, wherein said electrochemical cells include a positive plate, a negative plate and a separator disposed therebetween, said positive plate, negative plate and separator being spirally wound together.

46. The battery of claim 36, wherein said electrochemical cells include a positive plate, a negative plate and a separator disposed therebetween, said positive plate, negative plate and separator being arranged in parallel stacks.

47. The battery of claim 45, wherein at least one of said positive and negative plate is less than 0.01 inches thick.

48. The battery of claim 46, wherein at least one of said positive and negative plate is less than 0.01 inches thick.

49. The battery of claim 45, wherein said positive and negative plate include a metal film sandwiched between layers of electrochemically active paste and wherein said film of at least one of said positive and negative plate is substantially non-perforated.

50. The battery of claim 46, wherein said positive and negative plate include a metal film sandwiched between layers of electrochemically active paste and wherein said film of at least one of said positive and negative plate is substantially non-perforated.

51. A battery, comprising:
(a) a plurality of electrochemical cells; and
(b) an electrochemical case including:
 (i) a body having a plurality of cavities, each of said cavities being adapted to receive one of said electrochemical cells and being sealed from one another, and each cavity having a pressure relief valve and a first and second end;
 (ii) a first cover to cover said first end;
 (iii) a second cover to cover said second end; and
 (iv) a cap attached to one of said first and second cover, said cap being shaped to physically connect with an electrical device and allowing for electrical communication between said electrochemical cells and said electrical device.

52. The battery of claim 51, wherein said cap is shaped so it can be partially inserted within said electrical device.

53. The battery of claim 52, wherein said cap can be reversibly connected to said electrical device.

54. The battery of claim 51, further including an electrical unit, said electrical unit being housed in said cap and being selected from the group consisting of a recharger for recharging said electrochemical cells and a temperature sensor for monitoring the temperature within said body.

55. The battery of claim 51, wherein said cavities are substantially cylindrical in shape so as to receive substantially cylindrical electrochemical cells.

56. The battery of claim 55, wherein said electrochemical cell case includes at least three cylindrical cavities with their longitudinal axes parallel to one another.

57. The battery of claim 55, wherein said case includes exactly six cylindrical cavities positioned in two rows of three with their longitudinal axes parallel.

58. The battery of claim 51, wherein said electrochemical cells include a positive plate, a negative plate and a separator disposed therebetween, said positive plate, negative plate and separator being spirally wound together.

59. The battery of claim 51, wherein said electrochemical cells include a positive plate, a negative plate and a separator disposed therebetween, said positive plate, negative plate and separator being arranged in parallel stacks.

60. The battery of claim 58, wherein at least one of said positive and negative plate is less than 0.01 inches thick.

61. The battery of claim 59, wherein at least one of said positive and negative plate is less than 0.01 inches thick.

62. The battery of claim 58, wherein said positive and negative plate include a metal film sandwiched between layers of electrochemically active paste and wherein said film of at least one of said positive and negative plate is substantially non-perforated.

63. The battery of claim 59, wherein said positive and negative plate include a metal film sandwiched between layers of electrochemically active paste and wherein said film of at least one of said positive and negative plate is substantially non-perforated.

* * * * *